Nov. 13, 1956   S. FORMAN   2,770,291
HOBBYHORSES
Filed Nov. 8, 1954

INVENTOR,
SIDNEY FORMAN
BY Terry & Cohn
ATTORNEYS.

United States Patent Office 2,770,291
Patented Nov. 13, 1956

2,770,291

HOBBYHORSES

Sidney Forman, University City, Mo.

Application November 8, 1954, Serial No. 467,368

3 Claims. (Cl. 155—56)

This invention relates to improvements in hobbyhorses and similar riding types of play apparatus.

It is a major objective of the present improvements to realize a hobbyhorse assembly or the like which provides a combination of distinctly different types of controlled movements, and which affords highly enjoyable riding characteristics. Briefly summarized, a simulated animal body or other form of carrier for a rider is supported in a manner so as to realize a fore-and-aft movement within a predetermined range, to realize a rocking rotative movement under the influence and action of particularly arranged tension springs, and to realize an up and down movement, each of the stated movements being attained individually or in combination with any one or all of the others to provide an improved and more enjoyable riding action.

The foregoing and numerous other objectives of the invention will more clearly appear from the following detailed description of a preferred embodiment, particularly when considered in connection with the accompanying drawing, in which.

Figure 1:
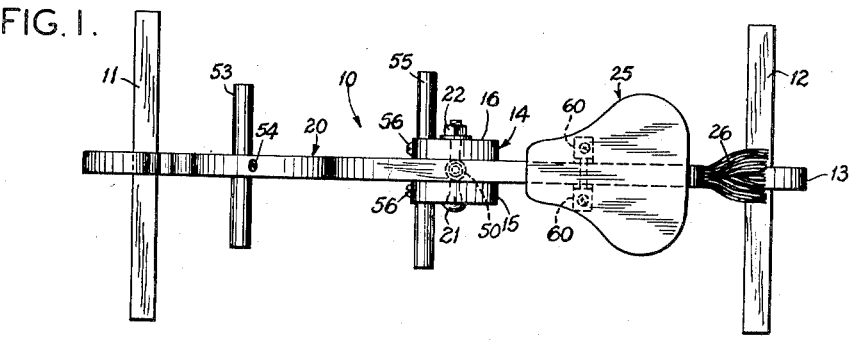
Fig. 1 is a top plan view of the hobbyhorse assembly.

The illustration of a horse in the drawing, and the following description of same is to be understood in an instructive sense. It is considered obvious and within the teaching of this invention that the carrier for the rider may take many different shapes and forms, among which may be a simulated body of any animal including a horse.

Figure 2:
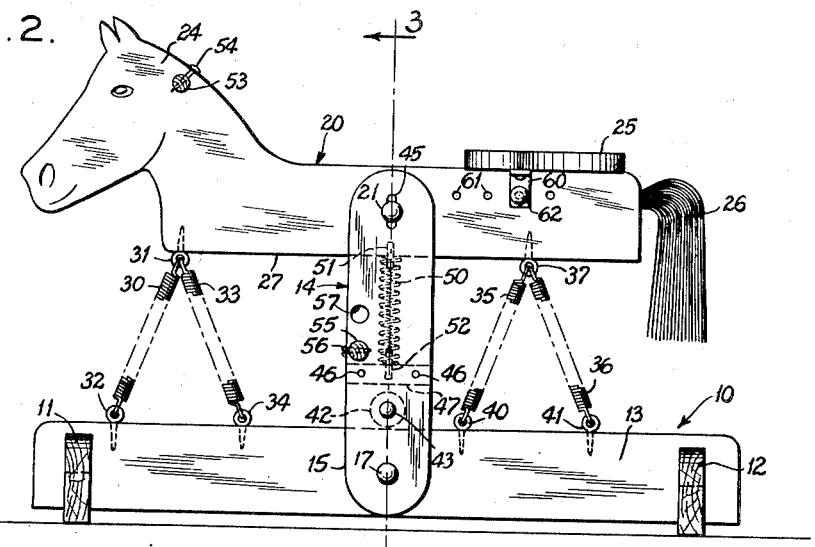
Fig. 2 is a side elevational view of the hobbyhorse assembly shown in Fig. 1.

Referring now by characters of reference to the drawing, it appears that the hobbyhorse assembly includes a base structure generally indicated at 10, the base structure 10 including a front cross bar 11 and a rear cross bar 12 adapted to seat on the subjacent floor as is shown in Fig. 2, and a longitudinal bar 13 connected to the medial portions of cross bars 11 and 12. The particular arrangement of the bars 11, 12 and 13 forms an H structure as is best shown in the plan view of Fig. 1.

An upright supporting member, referred to at 14, is carried by longitudinal bar 13 of base structure 10. The supporting member 14 includes spaced posts 15 and 16 located at opposite sides of longitudinal bar 13. The lower ends of posts 15 and 16 are connected to bar 13 by a bolt 17 and nut 18, the bolt 17 constituting a pivot pin. A pair of washers 19 is located about pivot pin 17 and at opposite sides of bar 13, the washers 19 serving as bearings for posts 15 and 16.

Attached to and connected to the uppermost ends of posts 15 and 16 of supporting member 14 is a simulated animal body, generally referred to at 20, the body 20 constituting a carrier for the rider. A bolt 21 extends through posts 15 and 16, and through body 20 located therebetween, and is adapted to receive nut 22. This bolt 21 constitutes a pivot pin which allows the body 20 to rock with a rotative movement, as will be explained in greater detail subsequently. A pair of wear-hardened washers 23 (Fig. 3) is located adjacent opposite sides of body 20, and serve to journal the pivot pin 21, and to act as bearings for the relative movements between the support member 14 and body 20.

The body 20 extends forwardly and rearwardly of the supporting member 14, the forward end being provided with a configuration 24 that closely approximates a horse's head, and the rear end being provided with a seat structure 25, the details and functional advantages of which will be later explained, and being provided with a horse's tail 26. The body 20 includes a straight lowermost margin 27.

Four tension springs are utilized to interconnect body 20 with base structure 10, two of which are located at each side of supporting member 14. Considering the body 20 disposed in its normal horizontal position as shown in Fig. 2, one of the tension springs 30 has its upper end connected to an eye bolt 31 fastened to the lowermost margin 27 of body 20. Tension spring 30 extends downwardly and forwardly from this uppermost connection, the lower end of the spring 30 being fastened to an eye bolt 32 connected to the upper surface of longitudinal bar 13 of base 10. A second tension spring 33 has its uppermost end also connected to the body 20 by eye bolt 31, and has its opposite lowermost end connected to an eye bolt 34 fastened to longitudinal bar 13. Tension spring 33 extends downwardly and rearwardly from its uppermost connection at bolt 31 to its lowermost connection at bolt 34. As is clearly shown in Fig. 2, the lower eye bolts 32 and 34 are spaced apart on longitudinal bar 13. The springs 30 and 33 constitute a pair of cooperating springs which are downwardly divergently related.

A second pair of tension springs 35 and 36 are located on the other side of supporting member 14. The uppermost ends of tension springs 35 and 36 are connected to eye bolt 37 fastened to the lower margin 27 of body 20. The opposite lower end of spring 35 is connected to an eye bolt 40 fastened to longitudinal bar 13, and the opposite lower end of tension spring 36 is connected to an eye bolt 41 fastened to longitudinal bar 13. Similar to the arrangement of tension springs 30 and 33 described previously, tension spring 35 extends downwardly and forwardly from its uppermost connection at bolt 37 to its lowermost connection at eye bolt 40, while tension spring 36 extends downwardly and rearwardly from its uppermost connection at bolt 37 to its lowermost connection at bolt 41, the eye bolts 40 and 41 being longitudinally spaced along longitudinal bar 13. Furthermore, it is noted that this pair of tension springs 35 and 36 is downwardly divergently related. Thus it appears that body 20 is free to move rotatively about the pivotal connection provided by pin 21, under the influence and action of the two pair of tension springs 30—33 and 35—36 respectively located on opposite sides of pin 21. The tension springs simulate the animal's legs.

As a result of the pivotal connection of the supporting member 14 with longitudinal bar 13 as provided by pivot pin 17, it appears that supporting member 14 is permitted to move in a fore-and-aft direction, and hence body 20 is permitted to move forward and backward with respect to longitudinal bar 13. To limit the range of this fore-and-aft movement of supporting member 14, a resilient roller 42 is mounted between posts 15 and 16 as appears more clearly in Fig. 3. A bolt 43 and nut 44 retain the roller 42 in position. The roller 42 is located immediately above the upper surface of longitudinal bar 13, and is adapted to engage and abut such upper surface. Since roller 42 is resilient, being preferably constructed of rubber stock, a range of fore-and-aft movement of supporting member 14 and body 20 is permitted, the resilient roller 42 constituting an abutment that coacts with longitudinal bar 13 to afford limits to such fore-and-aft movement, and to provide a cushioning effect. So it is seen that body 20 may be moved in a fore-and-aft direction within predetermined limits as determined by the abutment of resilient roller 42 with bar 13, such movement being about a pivot connection realized by pin 17. At the same time body 20 may be pivotally moved about pin 21 with a rotative movement under the influence of cooperating tension springs 30, 33, 35 and 36.

Figure 3:
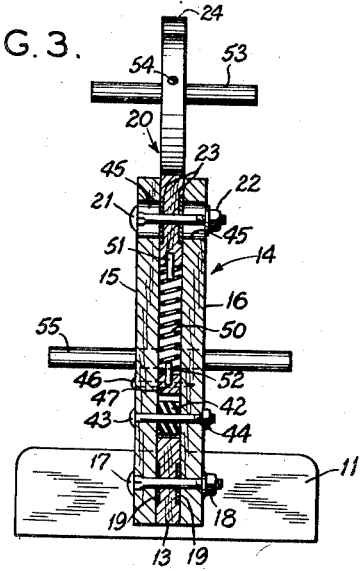
Fig. 3 is a cross sectional view as taken along line 3—3 of Fig. 2.

Still another type of movement is rendered possible with the improvements of this hobbyhorse assembly. As is best shown in Fig. 3, the pivot pin 21 is carried by body 20. Formed in each of posts 15 and 16 of supporting member 14, is an elongate slot 45 adapted to receive pin 21. Slots 45 are of such dimension as to permit a slidable movement of pin 21, and to determine a range of up and down movement of body 20. Fastened by screws 46 to and between posts 15 and 16 of supporting member 14, is a ledge or projection 47. A compression spring 50 is located between projection 47 and the lower margin 27 of body 20, the spring 50 having its upper and lower ends respectively retained by pin 51 attached to body 20 and by pin 52 attached to projection 47. The compression spring 50 acts to urge the body 20 into its uppermost position. It now appears that body 20 may be moved up and down to a predetermined extent, as provided by the movement of pivot pin 21 in slots 45 under the influence and action of compression spring 50.

The structural arrangement of this hobbyhorse assembly, as has been described, provides a combination of distinctly different types of movements, and hence affords more realistic riding characteristics. Briefly summarized, the simulated animal's body is supported in such a manner as to realize a fore-and-aft movement within a predetermined range about a pivotal connection as provided by pin 17, and as determined by resilient roller abutment 42 carried by the supporting member 14, to realize a rotative movement of body 20 about a pivotal connection provided by pin 21, and under the influence and action of two pairs of tension springs 30—33 and 35—36, and to provide an up and down movement of body 20 within a predetermined range as afforded by the slidable action of pin 21 in slots 45 under the action of compression spring 50. Each of the above described movements may be attained individually or in combination with any one or all of the others to provide an improved riding action.

A rod 53 is carried by the forward end of body 20, and is fixed thereto by screw 54, the rod 53 extending laterally outwardly of each side of body 20 to provide a hand-hold. Another rod 55 is carried by the supporting member 14, and is fixed by screws 56, the rod 55 extending through posts 15 and 16, and extending laterally outwardly thereof to provide a footrest or stirrup. The supporting member 14 is provided with an additional aperture 57 adapted to receive the stirrup rod 55 in order that the position of the stirrup rod 55 may be adjusted to accommodate the leg length of various riders.

The seat 25 is adjustably fixed to the rear end of body 20. A pair of angle brackets 60 is fixed to the underside of seat 25, and is adapted to engage opposite sides of body 20. Formed in the rear end of body 20, and hence at the rear of supporting member 14, are a series of apertures 61 adapted to receive a bolt 62 that fixes seat 25 in a particular position on body 20. Depending upon the weight of the rider, the seat 25 may be longitudinally adjusted along body 20 in a direction toward or away from the pivot pin 21. Obviously, this adjustment feature of the seat 25 permits selective adjustment of the load placed on tension springs 30, 33, 35 and 36 by controlling the torque about pin 21, so as to obtain certain riding characteristics in the movement of body 20.

Although the invention has been described by making detailed reference to a single preferred embodiment, such detail is to be understood in an instructive, rather than in any restrictive sense, many variants being possible within the scope of the claims hereunto appended.

I claim as my invention:

1. In a riding apparatus, a base including front and rear cross bars and a longitudinal bar, an upright supporting member, means pivotally connecting said upright member to said longitudinal bar, a carrier, means pivotally connecting said carrier to said upright member, a resilient element carried by said upright member, and adapted to abut the longitudinal bar to provide a range of fore-and-aft pivotal movement of said upright member about the pivotal connection of said member with said longitudinal bar, a pair of tension springs disposed on one side of said upright member, and a second pair of tension springs disposed at the other side of said upright member, the springs of each pair having upper ends connected to the carrier, and having lower ends connected to said longitudinal bar, one spring of each pair extending downwardly and forwardly from its upper end to its lower end, and the other spring of each pair extending downwardly and rearwardly from its upper end to its lower end.

2. In a riding type of play apparatus, a base, an upright supporting member, pivot means connecting said upright member to said base, a carrier member, a pivot pin carried by one of said members, the other member being provided with an elongate slot receiving said pin, spring means carried by said upright member, and acting to urge said carrier member upwardly, said pin being movable in said slot to permit downward movement of said carrier member against the action of said spring means, an abutment on said upright member adapted to engage said base to determine a range of fore and aft movement of said upright member about its pivotal connection to said base, and a pair of tension springs located at each side of said upright member, the spring of each pair having upper ends connected to said carrier member, and having lower ends connected to said base, the springs of each pair being downwardly divergently related from their upper ends.

3. In a riding type of play apparatus, a base including front and rear cross bars, and a bridging longitudinal bar, an upright supporting member, means pivotally connecting said upright member to said longitudinal bar, a carrier member, a pivot pin carried by one of said members, the other of said members being provided with an elongate slot receiving said pin, a projection on said upright member, a compression spring abutting said projection and said carrier member, and tending to urge said carrier member in an uppermost position, said pin being movable in said slot to permit downward movement of said carrier member against the action of said compression spring, a resilient roller carried by said upright member, said roller engaging said longitudinal bar to determine the range of fore-and-aft movement of said upright member about its pivotal connection to said longitudinal bar, and a pair of tension springs located at each side of said upright member, the springs of each pair having upper ends connected to said carrier member, and having lower ends connected to said longitudinal bar, the springs of each pair being downwardly divergently related from their upper ends.

References Cited in the file of this patent

UNITED STATES PATENTS

| | | |
|---|---|---|
| 735,319 | Urwick | Aug. 4, 1903 |
| 974,194 | Schulze | Nov. 1, 1910 |
| 1,289,382 | Brurock | Dec. 31, 1918 |
| 2,506,890 | Pratt | May 9, 1950 |